Nov. 8, 1938.     R. C. RUSSELL     2,136,023
ACTUATING LEVER AND LINKAGE
Filed Aug. 25, 1937
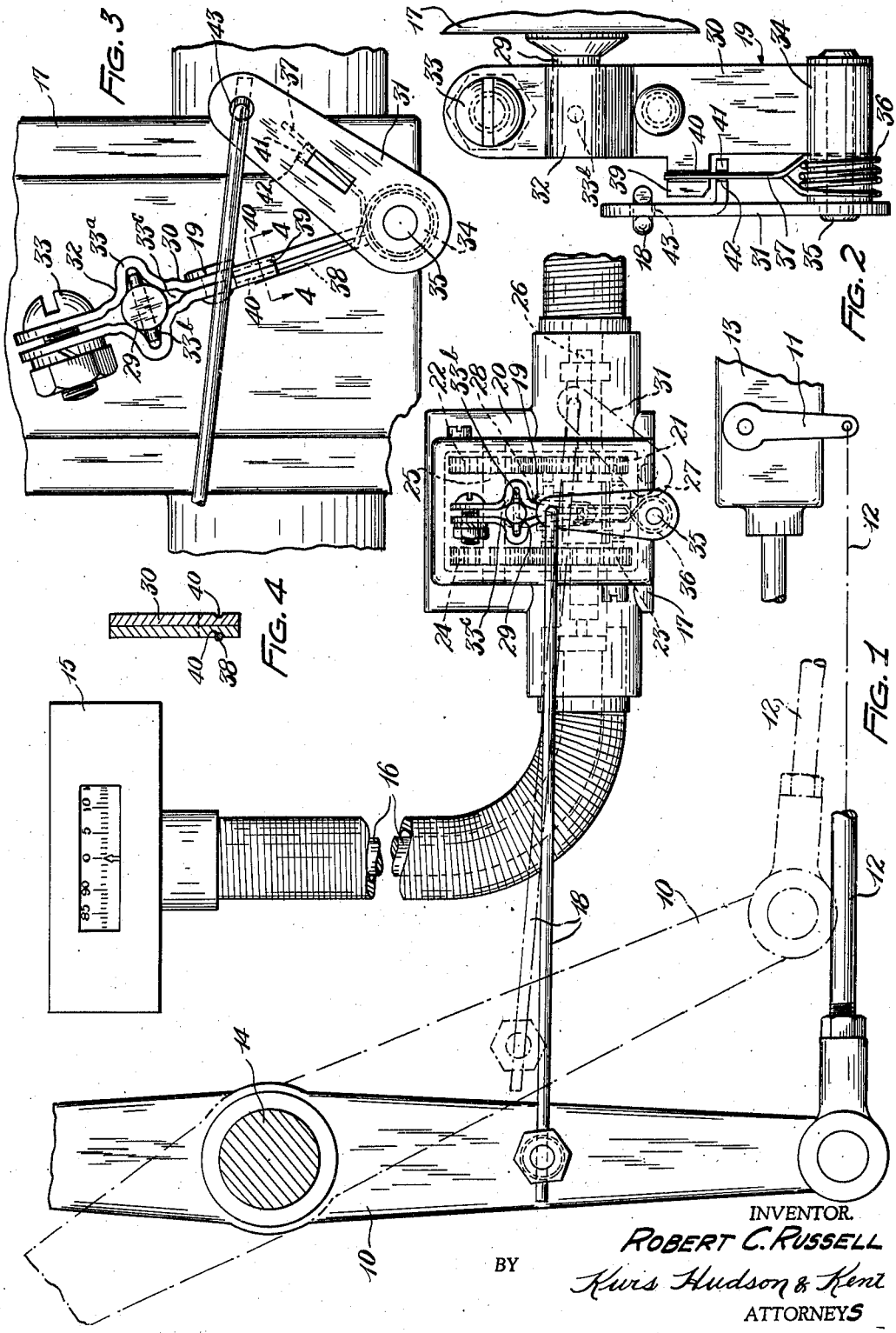
INVENTOR.
ROBERT C. RUSSELL
BY
Kwrs Hudson & Kent
ATTORNEYS Patented Nov. 8, 1938

2,136,023

UNITED STATES PATENT OFFICE 2,136,023

ACTUATING LEVER AND LINKAGE

Robert C. Russell, Shaker Heights, Ohio, assignor to Eaton Manufacturing Company, Cleveland, Ohio, a corporation of Ohio Application August 25, 1937, Serial No. 160,872

4 Claims. (Cl. 74—470)

This invention relates generally to actuating levers and linkage and more specifically to a novel lever, the use of which enables a device to be actuated by the same linkage or means which actuates some other device.

An object of my invention is to provide a novel form of lever for actuation of a device, such as a ratio changer, by motion transmitted thereto from the member or linkage which actuates another device.

Another object of my invention is to provide a novel lever having means for connecting the same with a shaft to be actuated and a yieldable arm connected therewith.

A further object of my invention is to provide a shift lever having an actuating arm which is movable relative to the lever but which is held against said relative movement unless the lever-actuating force being applied to the arm exceeds a predetermined value.

Still another object of my invention is to provide a shift lever, of the type referred to, in which a preloaded spring tends to prevent relative movement between the arm and lever but permits a substantial amount of such relative movement, when conditions require it, without causing an excessive increase in the spring load.

My invention may be further briefly summarized as consisting in certain novel arrrangements and combinations of parts hereinafter described and particularly set out in the appended claims.

In the accompanying sheet of drawings,

Fig. 1 is an elevational view, somewhat diagrammatic in form, showing my novel lever applied to the operation of a speedometer gear device or ratio changer;

Fig. 2 is a side elevation of the lever showing the same on a somewhat larger scale;

Fig. 3 is a partial elevational view similar to Fig. 1 but showing the lever on a larger scale; and Fig. 4 is a partial sectional view taken through the lever as indicated by line 4—4 of Fig. 3.

More detailed reference will now be made to the accompanying drawing in which I show my novel lever applied to the operation of a ratio changer, but it should be understood that the drawing is to be regarded as being mainly illustrative and that the invention may be applied to various other uses and mechanisms.

In the arrangement illustrated in Fig. 1 my novel lever is employed to operate or change the setting of a transmission or ratio changer for a speedometer drive in response to movement of the main operating lever or member of another device. An arrangement of this kind is especially useful on a motor vehicle having a ratio changing device at a point between the usual transmission and the driving wheels, for example, on a vehicle having a two-speed driving axle. On a vehicle of this type it is desirable to operate or set the ratio changer of the speedometer drive at the same time and by the same control which actuates the gearing of the two-speed axle. In previous attempts to accomplish this end considerable difficulty has resulted from the fact that the movement of the main control necessary to set the two-speed axle is usually more than the movement needed to operate the ratio changer of the speedometer drive and the excessive movement at the latter device caused damage to the same or to its operating linkage. The use of my novel lever prevents damage to the ratio changer of the speedometer drive and to its operating linkage by providing a certain flexibility and freedom of movement beyond what is required for setting or actuating the ratio changer of the speedometer drive.

In Fig. 1 of the drawing I show a main actuating member in the form of a pivoted lever 10, which has one end thereof connected with a lever 11, by means of a link or rod 12. The lever 11 may be an actuating member or control for setting or adjusting a transmission device 13 which may be located at a point intermediate the usual transmission and the driving wheels of a vehicle, for example, on the two-speed driving axle mentioned above. The main lever 10 may be adapted for manual operation by the driver of the vehicle or by suitable power means controlled by him. In the arrangement herein illustrated, swinging of the lever 10 in one direction on its pivot 14 will shift the lever 11 of the device 13 to decrease the transmission ratio and swinging of the lever 10 in the opposite direction will cause an increase in the transmission ratio.

I also show the usual speedometer 15, which may be driven from the main transmission or the propeller shaft of the vehicle by a flexible shaft 16. An auxiliary transmission device or ratio changer 17 is included at a suitable point in the drive to the speedometer and, through the connecting wire or link 18 and my novel lever 19 to be described hereinafter, is adapted to be operated or set by movement of the main lever 10, so that when the setting of the device 13 is changed by actuation of the main lever, the transmission ratio of the drive to the speedometer will be changed correspondingly.

The device 17 may be a two-speed transmission device of any suitable type or construction, for example, as illustrated in this instance, this device may have a housing 20 containing pairs of cooperating gears 21, 22 and 23, 24. The gears 22 and 24 are keyed to a countershaft 25 and the gear 21 is splined on the shaft 26. The gears 21 and 23 are adapted to rotate freely on the shaft 26 on opposite sides of a clutch member or sleeve 27, which is slidably splined on this shaft. The adjacent faces of the gears 21 and 23 have lugs or teeth thereon adapted to be selectively engaged by similar lugs or teeth on the ends of the clutch sleeve 27 when the latter is shifted by oscillation of the fork 28 and the shaft 29. When the clutch member 27 is in engagement with the gear 21 the speedometer drive is through the countershaft 25 and the gears 22 and 24 to afford a given ratio and when the clutch member is in engagement with the gear 23 the speedometer drive passes directly through the shaft 26 and the latter gear while the gears 21, 22 and 24 run as idlers.

My novel lever 19 is connected with the shaft 26 and causes shifting or setting of the ratio changer 17 in response to motion transmitted from the main lever 10 through the link 18. This lever comprises a main arm or lever 30 which is connected with the shaft 29 and a yieldable arm 31 at its outer end with which the link 18 is connected. The arm 30 may be formed from strip metal which is doubled to provide a clamping portion 32 adapted to grip the shaft 29 upon tightening of the screw 33. At the point of engagement with the shaft, the arm 30 may have oppositely bowed portions 33a adapted to receive the ends of a pin 33b which extends through a transverse opening of the shaft. The arm 30 may also have recessed portions 33c adapted to receive the pin 33b when the arm connection with the shaft is to be shifted 90°. At the outer end of the lever the doubled strip metal forms a hollow bearing 34 which projects beyond one edge of the arm 30 and whose axis is substantially parallel with the axis of the shaft 29. The arm 31 is connected with the outer end of the arm 30 by means of a pivot pin 35 extending through the bearing 34.

To provide a yieldable connection between the arm 31 and the main arm 30 I employ a coil spring 36 which is disposed around the projecting portion of the bearing 34 with its opposite ends forming substantially straight arms 37 and 38 extending toward the shaft 29. A projection 39 on the arm 30 forms a stop for the spring ends and has grooves 40 in opposite sides thereof in which the spring ends engage. The arm 31 has a lug 41 which extends therefrom toward the arm 30 and between the spring ends 37 and 38. This lug also has grooves 42 in the opposite sides or edges thereof which lie in substantially the same plane as the grooves 40 of the main arm projection 39.

When the arm 31 is pivotally connected with the main arm 30 during the assembling of the device the coil spring 36 is placed under initial tension or load, so that the ends 37 and 38 thereof engage in the grooves of the stop 39 and press thereagainst as the result of the tendency of the spring to unwind. The spring ends thus normally bear against the stop 39 and, since the lug 41 extends between the spring ends, it will be seen that the arm 31 is normally held in substantial alignment with the main arm 30 by the spring with its free end extending toward the shaft 29. An opening 43 may be provided in such free end of the yieldable arm 31 for connection of one end of the link 18 therewith.

From the construction and arrangement described for my novel lever it will be seen that when a pushing or pulling force is transmitted through the link 18 it will act on the arm 31 and, through the spring 36, on the main arm or lever 30. The spring 36 is preferably such that its resistance to flexing will be sufficient to cause the initial movement of the link 18 to be transmitted therethrough to the main arm 30 and cause shifting of the clutch member 27 of the speedometer transmission 17. Upon completion of such shifting of the clutch member 27, the swinging of the main arm 30 is arrested and further motion transmitted from the lever 10 through the link 18 merely causes swinging of the arm 31 relative to the main arm 30.

The initial swinging of the arm 31 relative to the arm 30 causes the lug 41 to engage and pick up one or the other of the ends of the spring 36, depending upon the direction of such relative swinging. The shifting of one spring end away from the stop 39 while the other spring end bears against the opposite side of the stop produces further tensioning of the spring 36 which later causes the arm 31 to be returned to its position of alignment with the arm 30 when the initial return movement of the lever 10 takes place and before the arm 30 is swung in the reverse direction. Thus, the yieldable connection which I have provided acts to hold the arm 31 in substantial alignment with the main arm 30, but yields to permit an overtravel of the arm 31 when the arm 30 comes to a stop. The yielding of the arm 31 also permits a substantial travel of the link 18 in both directions, such as might result from jolting of the main lever 10 or swinging thereof by forces transmitted from the driving axle, without changing the setting of the ratio changer 17 or damaging the linkage. The grooves 40 of the stop 39 and the groove 42 of the lug 41 provide firm engagement between the spring ends and these parts, so that a tendency for the spring ends to jump or slide off the stop or lug will be effectively prevented.

It will be noted that the free end of the arm 31, to which the link 18 is connected, is relatively near the shaft 29. This provides for actuation of the shaft 29 by a force applied at a relatively short lever arm distance which permits the speedometer transmission 17 to be shifted or set by a very short travel of the link 18, perhaps only a travel of one-quarter of an inch. However, after the transmission 17 has been set by this initial short travel of the link 18, an overtravel of one hundred per cent or more is permitted by the relative swinging of the arm 31. The characteristics of the preloaded spring 36 are such that when this overtravel occurs the "load build up" of the spring, that is, the increase in spring stiffness due to its distortion, will not be great enough to cause excessive pressure to be transmitted to the mechanism of the speedometer transmission 17 and this mechanism will not be damaged as has been the case with certain other types of actuating levers.

From the foregoing description and the accompanying drawing it will now be readily seen that I have provided a novel and efficient lever and link arrangement whereby a speedometer gear or other auxiliary device may be actuated at the same time, and from the same lever, that actuates the control of another or main device such as a two-speed axle. It will be seen further that my novel lever provides an operating connection which affords a substantial amount of flexibility or overtravel and thus prevents overloading or breakage of the auxiliary device or the actuating linkage While I have illustrated and described the device of my invention in a somewhat detailed manner, it will be understood, of course, that I do not wish to be limited to the precise details and arrangements herein disclosed, but regard my invention as including such changes and modifications as do not constitute a departure from the spirit of the invention and the scope of the appended claims.

Having thus described my invention, I claim:

1. A device of the character described comprising a lever having means for connecting the same with a shaft, an arm, pivot means connecting an end of said arm with the outer end of said lever, a coil spring disposed around said pivot means and having its ends engageable with the lever at a point spaced from the pivot means, means on said arm engageable with one or the other of said spring ends upon swinging of the arm relative to said lever, and actuating means connected with the arm at a point spaced from said pivot means.

2. A device of the character described comprising a lever having means for connecting the same with a shaft, an arm, pivot means connecting an end of said arm with the outer end of said lever, a stop on said lever between said connecting means and said pivot means and having grooves in opposite sides thereof, a coil spring disposed around said pivot means and having its ends engaging in the grooves of said stop, grooved means on said arm adapted to pick up one or the other of said spring ends upon swinging of the arm relative to said lever, and actuating means connected with the free end of said arm.

3. An actuating lever designed to permit overtravel, comprising an arm having means adjacent one end for connection with a shaft, a second arm pivoted on the first arm adjacent its other end and having a free end extending toward said connecting means and adapted to be engaged by an actuating link, and a preloaded spring disposed around the pivot of said second arm and having ends extending substantially radially with respect to said pivot and acting on said arms and adapted to transmit actuating force from the second arm to the first arm, said spring being adapted to prevent relative movement between the arms to cause actuation of the shaft and to permit such relative movement after actuation of the shaft.

4. A device of the character described comprising a lever fulcrumed for swinging movement, an arm, pivot means mounting said arm on the lever at a point spaced from the fulcrum of the latter, a stop on the lever, a coil spring disposed around said pivot means and having its ends engageable with opposite sides of said stop, means on the arm extending between said spring ends, and actuating means connected with the arm at a point spaced from said pivot means, said spring being preloaded to cause its ends to engage said stop and to resist swinging of the arm relative to the lever.

ROBERT C. RUSSELL.